United States Patent
Remis et al.

(10) Patent No.: US 10,551,858 B2
(45) Date of Patent: *Feb. 4, 2020

(54) SELECTION OF A DEFAULT PHASE IN A MULTIPHASE VOLTAGE REGULATOR BASED ON A WEAR SCORE

(71) Applicant: Lenovo Enterprise Solutions (Singapore) Pte. Ltd., Singapore (SG)

(72) Inventors: Luke D. Remis, Raleigh, NC (US); Brian C. Totten, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,200

(22) Filed: Apr. 22, 2019

(65) Prior Publication Data

US 2019/0243399 A1    Aug. 8, 2019

Related U.S. Application Data

(63) Continuation of application No. 15/499,963, filed on Apr. 28, 2017, now Pat. No. 10,289,138.

(51) Int. Cl.
*G05F 1/56* (2006.01)
*G05B 15/02* (2006.01)

(52) U.S. Cl.
CPC .............. *G05F 1/56* (2013.01); *G05B 15/02* (2013.01)

(58) Field of Classification Search
CPC ... G05F 1/46; G05F 1/462; G05F 1/52; G05F 1/56; G05F 1/565; G05F 1/59; G05F 1/595; G05B 15/00; G05B 15/02
See application file for complete search history.

(56) References Cited

U.S. PATENT DOCUMENTS

| | | | |
|---|---|---|---|
| 4,695,737 A * | 9/1987 | Rabon | G05F 1/468 307/31 |
| 10,289,138 B2 * | 5/2019 | Remis | G05B 15/02 |
| 2010/0100756 A1 * | 4/2010 | Rahardjo | G06F 1/28 713/330 |
| 2017/0031782 A1 * | 2/2017 | Totten | G06F 1/26 |

* cited by examiner

*Primary Examiner* — Matthew V Nguyen
(74) *Attorney, Agent, or Firm* — Jeffrey L. Streets

(57) ABSTRACT

A computer program product and an apparatus are provided. The computer program product includes a computer readable medium and program instructions embodied therein, wherein the program instructions are executable by a processor to cause the processor to perform various operations. The operations include obtaining, for each phase in a voltage regulator having multiple phases, values of at least one operating parameter over a period of time. The operations further include determining, for each phase in the multiphase voltage regulator, a wear score as a function of the obtained values of at least one operating parameter. Still further, the operations include selecting a default phase, from among the multiple phases, that has a wear score indicating that the phase has less cumulative wear than any of the other phases, and instructing the voltage regulator to turn on the selected phase as a default phase when only one phase is turned on.

19 Claims, 3 Drawing Sheets

PHASE OPERATING DATA

| OPERATING PARAMETER | WEIGHTING (%) | PHASE 1 | PHASE 2 | PHASE 3 |
|---|---|---|---|---|
| CUMULATIVE RUN TIME (HOURS) | 20 | 10,000 | 6,000 | 5,000 |
| CUMULATIVE RUN TIME > TEMP. THRESHOLD (HOURS) | 40 | 5,000 | 2,000 | 1,500 |
| CUMULATIVE RUN TIME > CURRENT THRESHOLD (HOURS) | 40 | 3,000 | 1,000 | 300 |
| | | | | |
| WEAR SCORE | | 5,200 | 2,400 | 1,720 |
| RANK (ORDER OF USE) | | 3 | 2 | 1 |

FIG. 2

SELECTION OF A DEFAULT PHASE IN A MULTIPHASE VOLTAGE REGULATOR BASED ON A WEAR SCORE

CROSS-REFERENCE TO RELATED APPLICATIONS

This application is a continuation of U.S. patent application Ser. No. 15/499,963 filed on Apr. 28, 2017, which application is incorporated by reference herein.

BACKGROUND

The present disclosure relates to voltage regulators and methods of regulating voltage.

BACKGROUND OF THE RELATED ART

A voltage regulator is an electronic circuit that is designed to control an output voltage at a constant level. Using a control loop, the voltage regulator senses the output voltage and automatically makes adjustments within the electronic circuit in order to maintain the output voltage constant at the selected voltage. For example, the voltage regulator may be used to stabilize the voltage of the direct current output that is supplied to a processor unit and other components of a computer.

A high performance voltage regulator may have multiple parallel switching stages or phases. A voltage regulator with multiple phases may have the means to "scale" the power output, such that the voltage regulator can efficiently support a wide-range of power delivery.

BRIEF SUMMARY

Some embodiments provide a computer program product comprising a non-volatile computer readable medium and non-transitory program instructions embodied therein, the program instructions being configured to be executable by a processor to cause the processor to perform various operations comprising: obtaining, for each phase in a voltage regulator having multiple phases, values of at least one operating parameter over a period of time; determining, for each phase in the multi-phase voltage regulator, a wear score as a function of the obtained values of at least one operating parameter; selecting a default phase, from among the multiple phases, that has a wear score indicating that the phase has less cumulative wear than any of the other phases; and instructing the voltage regulator to turn on the selected phase as a default phase when only one phase is turned on.

Some embodiments provide an apparatus comprising a baseboard management controller in communication with at least one storage device for storing program instructions, wherein the baseboard management controller is configured for communication with a multi-phase voltage regulator and includes a processor, the program instructions being configured to be executable by the processor to cause the baseboard management controller to perform operations comprising: obtaining a value of at least one operating parameter of each phase of the multi-phase voltage regulator over a period of time; determining, for each phase in the multi-phase voltage regulator, a wear score as a function of the obtained values of at least one operating parameter for the phase; selecting a default phase, from among the multiple phases, that has a wear score indicating that the phase has less cumulative wear than any of the other phases; and instructing the voltage regulator to designate the selected phase as a default phase that the voltage regulator will use when only one phase is turned on.

BRIEF DESCRIPTION OF THE SEVERAL VIEWS OF THE DRAWINGS

FIG. 2 is an illustration of one example of calculating a wear score and a phase rank.

DETAILED DESCRIPTION

Figure 1:
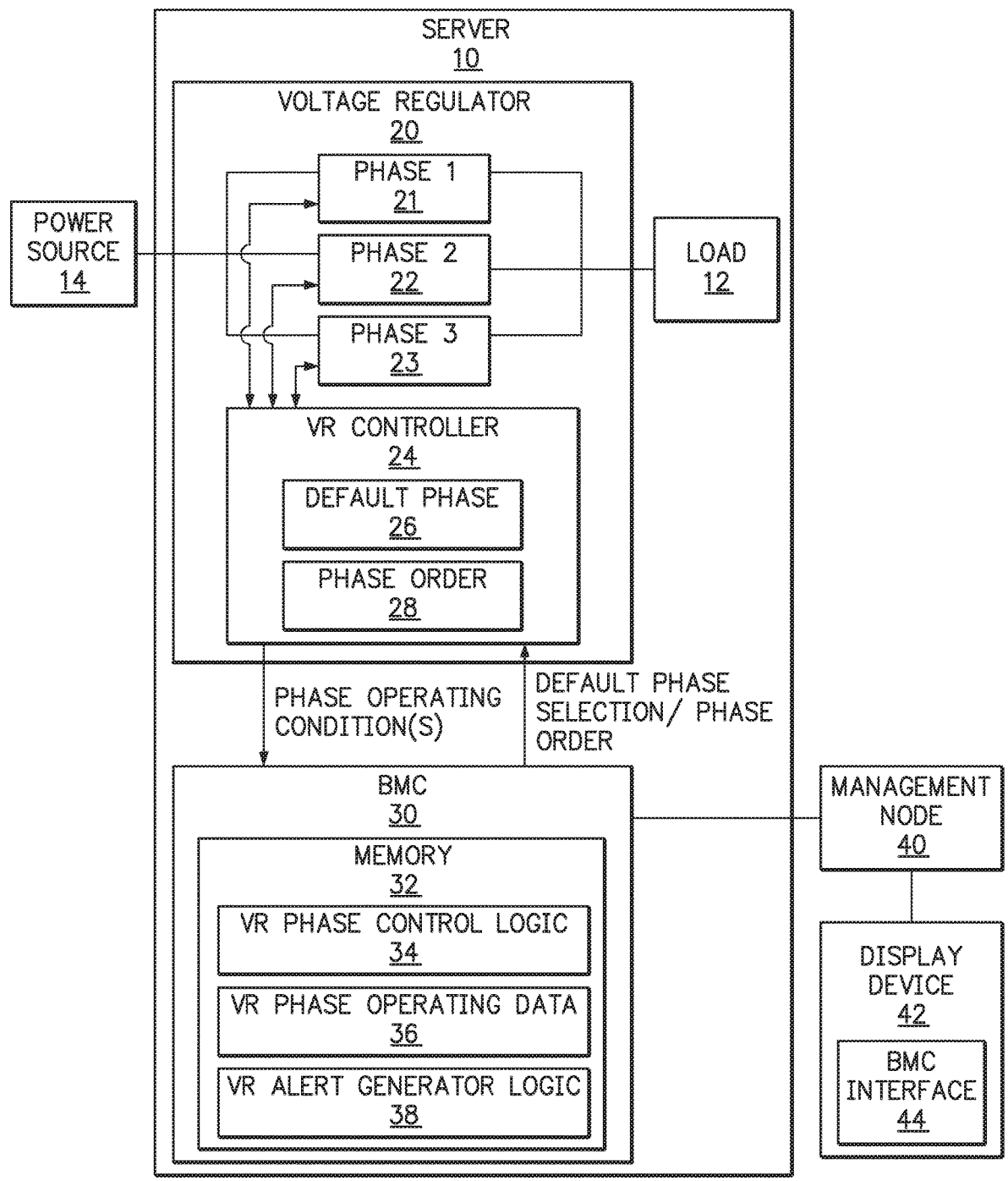
FIG. 1 is a diagram of a server including a baseboard management controller in communication with a voltage regulator.

Some embodiments provide a method comprising obtaining, for each phase in a voltage regulator having multiple phases, values of at least one operating parameter over a period of time. The method further comprises determining, for each phase in the multi-phase voltage regulator, a wear score as a function of the obtained values of at least one operating parameter. Still further, the method comprises selecting a default phase, from among the multiple phases, that has a wear score indicating that the phase has less cumulative wear than any of the other phases, and instructing the voltage regulator to turn on the selected phase as a default phase when only one phase is turned on.

In one option, the method may further comprise ranking each phase in an order of the wear score, and instructing the voltage regulator to sequentially turn on the phases in the ranked order as additional phases are needed to satisfy a load. Where the wear score for each phase in the multi-phase voltage regulator increases with additional use of the phase, the order may rank each phase in ascending order of the wear score. According, a phase with the least amount of wear, as indicated by having the lowest wear score, may be used first. As additional phases are recruited to be turned on, the phase with the next lowest wear score is turned on. In one embodiment, a phase may be turned on by enabling a voltage to be applied to the gate terminal of a field effect transistor (FET).

The at least one operating parameter of each phase may be selected from input voltage, field-effect transistor (FET) temperature, run time, output current, and combinations thereof. An operating parameter may be measured specifically for each phase. Furthermore, an operating parameter may be determined using measurements that are specific to the phase. For example, if the operating parameter is cumulative hours of run time at a temperature above a threshold temperature, the phase temperature is measured and provided to the baseboard management controller. The baseboard management controller may then determine how long the phase runs at a temperature above the temperature threshold.

Since the wear of each phase is determined over time, the method may output a warning to a user in response to identifying that one or more phase, from among the multiple phases, has a wear score greater than a wear threshold value. Alternatively, the method may output a warning to a user in response to identifying that each of the multiple phases has a wear score greater than a wear threshold value. Such warnings may be output to the use in any form via any device, such as a text-based graphic displayed on a display screen or an audible alert. Optionally, the display device may be coupled to a management node that communicates with the baseboard management controller (BMC) of any number of servers. The management node may run a BMC interface, such as a BMC webpage, that displays the warning from the BMC.

A default phase and/or a ranked order of phases may be selected and communicated to the voltage regulator at any time, such as periodically or in response to an event. Non-limiting examples of an event that could trigger an updating of the default phase and/or the ranked order of phases include a power cycle of the voltage regulator, the wear score of a phase exceeding a wear threshold, a change in which phase has the lowest wear score, and a change in the ranked order of the phases.

A wear score may, for example, be calculated using an equation, such as an equation that applies a relative weighting (percentage) to multiple operating parameters. The weighting that is applied to the value of each operating parameter has preferably been predetermined to approximate an amount of wear in a nominally similar voltage regulator having similar values of the at least one operating parameter. The at least one operating parameter of each phase preferably includes an operating parameter that is cumulative over the lifetime of the voltage regulator, such as cumulative run time, cumulative run time above a temperature threshold, or cumulative run time above a current threshold.

Some embodiments provide an apparatus comprising a multi-phase voltage regulator having a controller and a plurality of phases, wherein the controller controls each of the phases and designates a default phase that is used when only one phase is turned on. The apparatus further comprises a baseboard management controller in communication with the voltage regulator and at least one storage device for storing program instructions, wherein the baseboard management controller includes a processor for processing the program instructions to: obtain a value of at least one operating parameter of each phase of the multi-phase voltage regulator over a period of time; determine, for each phase in the multi-phase voltage regulator, a wear score as a function of the obtained values of at least one operating parameter for the phase; select a default phase, from among the multiple phases, that has a wear score indicating that the phase has less cumulative wear than any of the other phases; and instruct the voltage regulator to designate the selected phase as the default phase that the voltage regulator will use when only one phase is turned on.

Some embodiments provide an apparatus comprising a baseboard management controller in communication with at least one storage device for storing program instructions, wherein the baseboard management controller is configured for communication with a multi-phase voltage regulator and includes a processor, the program instructions being configured to be executable by the processor to cause the baseboard management controller to perform operations comprising: obtaining a value of at least one operating parameter of each phase of the multi-phase voltage regulator over a period of time; determining, for each phase in the multi-phase voltage regulator, a wear score as a function of the obtained values of at least one operating parameter for the phase; selecting a default phase, from among the multiple phases, that has a wear score indicating that the phase has less cumulative wear than any of the other phases; and instructing the voltage regulator to designate the selected phase as a default phase that the voltage regulator will use when only one phase is turned on.

Embodiments of the apparatus may implement any of the method embodiments disclosed herein. For example, the baseboard management controller may further process the program instructions to independently select, from among the multiple phases, a default phase following each power cycle of the voltage regulator, or to rank each phase in an order of the wear score and instruct the controller of the voltage regulator to sequentially turn on the phases in the ranked order.

The apparatus may further include a display device, wherein the baseboard management controller outputs a warning to the display device in response to identifying that each of the multiple phases has a wear score greater than a wear threshold value.

Embodiments are expected to benefit from a longer operational life since the wear may be dynamically distributed among the multiple phases of the voltage regulator. For example, each phase may be designated as the default phase at some point in time depending upon the cumulative wear of each phase. Similarly, embodiments may dynamically modify the order in which the phases are recruited in response to a change in the level of current being demanded by a load. For example, a phase with the least wear may be recruited into service first and a phase with the most wear may be recruited into service last, with other phases being recruited sequentially in a ranked order from least wear to most wear. Furthermore, the wear of each individual phase is separately determined over time with additional use of the voltage regulator. The baseboard management controller may calculate a phase-wear score based on the values of at least one operating parameter.

In one method, when the server powers on, the baseboard management controller (BMC) searches its memory for each wear score history of each phase in the voltage regulator. Then, based on a comparison of the wear scores among the phases, the BMC will instruct the voltage regulator to designate a selected phase as the default phase and may instruct the voltage regulator to turn on phases, as needed, in a ranked order from the phase with the least wear to the phase with the most wear. While the voltage regulator is under load, the BMC monitors and stores at least one operating parameter, such as temperature, time, current and voltage, which each phase is experiencing. This updated operating information may be used to select a default phase and/or ranked order for use during the next power cycle. Alternatively, the BMC may instruct the voltage regulator to use a different phase as the default phase in response to the wear score of the previously designated default phase exceeding a wear threshold.

In one example, the BMC may first instruct the voltage regulator controller to use its phase 1 (of n phases) as the default phase during a first time period. Later, the BMC may instruct the voltage regulator controller to use its phase 2 as the default phase during a second time period. Alternatively, the controller could use a plurality of phases during each time period, but instruct the voltage regulator to use different phases during subsequent time periods based upon the relative wear scores of each phase. Each of the n phases are part of the same voltage regulator and share the same output voltage.

The voltage regulator includes multiple phases, such as parallel switching stages. The voltage regulator further includes sensors that measure and report the measured values of various operating parameters for each phase of the voltage regulator. For example, the measured operating parameters may include input voltage, field-effect transistor (FET) temperature, run time, output current, and combinations thereof. The at least one operating parameter may be any measurable or determinable parameter that is correlated to degradation in the accuracy of the current sensing circuit.

For example, the BMC may determine at least one operating parameter selected from cumulative power-on time, cumulative time in operation above a temperature threshold, cumulative time in operation above a current threshold, present age of the voltage regulator, and combinations thereof. Optionally, the at least one operating parameter may be a plurality of operating parameters. The BMC can obtain the operating parameters for each phase via digital communication with the voltage regulator controller.

A "wear score" for a given phase may be determined using a calculation derived from empirical testing and/or modeling. One or more operating parameters are used as the independent variable that determines an associated amount of wear. In one example, the BMC may calculate a period of time that the voltage regulator has been operating with only phase #1 of n phases on. If that time period exceeds some threshold, then the BMC could request that the voltage regulator change the active phase (i.e., a phase that is turned on and delivering current) from phase #1 to phase #2, and monitor the amount of time that #2 is in the active phase.

In another example, the BMC may calculate a wear score for each phase by weighting the influence of multiple operating parameters. If an amount of time that a phase operates at a first set of operating conditions (i.e., high current and low temperature) is found to reduce the expected life of the phase by 20%, but operation of the phase at a second set of operating conditions (i.e., low current and high temperature) is found to reduce the expected life of the phase by only 5%, then the first set of operating conditions may be weighted more heavily when calculating a wear score.

The BMC may then determine the relative wear of each phase by comparing the wear score for each phase. Over time, the BMC may instruct the voltage regulator to use a selected phase having a lower wear score than the other phases, such that the phases experience more evenly distributed wear. Accordingly, it is expected that none of the phases will prematurely wear to the point of failure as would a phase that is always the default phase for use during power-on and deep sleep states.

A voltage regulator having multiple phases may be characterized using a test environment, wherein the test equipment collects and stores a measure of cumulative wear on a phase in association with the values of various operating parameters. The collected data may then be analyzed to determine what operating parameters cause wear on the phase. For example, a field-effect transistor (FET) may experience a change in resistance due to degradation of a semiconductor layer, which can be caused by operating the FET under conditions exceeding a threshold value of the at least one operating parameter. Furthermore, the collected data may be analyzed to identify at least one operating parameter of a phase that correlates with the wear of the phase. In one non-limiting example, the collected data may be analyzed using regression analysis, such as a linear regression analysis between phase wear (as the independent variable) and the values of various of the collected operating parameters or combinations of operating parameters (as the dependent variable). More specifically, if the phase wear is found to vary linearly with cumulative time in operation above a current threshold, then such linear correlation may be characterized in a lookup table or as a mathematical function. For example, a lookup table may include multiple records (i.e., rows), where each record (row) associates a value (or range of values) for the operating parameter with a wear score. In a lookup table, a wear score may be associated with the value (or range of values) of one or more operating parameter by virtue of being in the same record (row) of the table. The wear in each record is predetermined to occur in a phase that experiences the range of values of the operating parameter. The lookup table may then be used in systems having a voltage regulator that is nominally similar to the voltage regulator that was characterized. The phase of the nominally similar voltage regulator may be expected to have a similar amount of wear when observed to have similar values of the at least one operating parameter. Over time, the system may dynamically determine an amount of wear for each phase in response to changes in the cumulative value of the at least one operating parameter.

In one embodiment, determining a wear score as a function of the values of the at least one operating parameter over time, may include using a lookup table to find wear score that is associated with a range of values for the at least one operating parameter. The lookup table may include multiple records based on actual voltage regulator phase wear data collected during operation of another voltage regulator that is nominally similar to the voltage regulator in communication with the BMC, wherein each record includes a range of values for the at least one operating parameter and a value for the wear score.

As used herein, "nominally similar" voltage regulators typically have the same rating or model number, such that two "nominally similar" voltage regulators are expected to perform the same and the current sensing circuits of the voltage regulators are expected to experience a similar amount and character of accuracy drift with similar use. The term "nominally similar" allows for a normal range of differences between voltage regulators that are made within the tolerances of a given manufacturing specification. "Nominally similar" voltage regulators may often have the same rating, the same model number or the same stock keeping unit (SKU).

Some embodiments provide a computer program product comprising a non-volatile computer readable medium and non-transitory program instructions embodied therein, the program instructions being configured to be executable by a processor to cause the processor to perform various operations comprising: obtaining, for each phase in a voltage regulator having multiple phases, values of at least one operating parameter over a period of time; determining, for each phase in the multi-phase voltage regulator, a wear score as a function of the obtained values of at least one operating parameter; selecting a default phase, from among the multiple phases, that has a wear score indicating that the phase has less cumulative wear than any of the other phases; and instructing the voltage regulator to turn on the selected phase as a default phase when only one phase is turned on.

Further embodiments may include computer program products that include program instructions for implementing or initiating any one or more aspects of the methods described herein. Accordingly, a separate description of the methods will not be duplicated in the context of a computer program product.

FIG. 1 is a diagram of a server 10 including a baseboard management controller 30 in communication with a voltage regulator 20. The voltage regulator 20 is a multiphase voltage regulator including three phases 21, 22, 23 and a controller 24. The controller 24 controls which of the phases 21, 22, 23 are used (i.e., turned on) at any point in time. When a load 12, such as a processor and other server components, are turned on, the load 12 draws current from a power source 14 through the voltage regulator 20. During initial power on of the load 12, the voltage regulator 20 may provide sufficient current using a single phase. However, the number of phases in use at any point in time may vary to satisfy the electrical current demand of the load 12. During initial power on and during periods of time that the load enters a sleep state, the controller 24 may designate any one of the three phases 21, 22, 23 as the default phase. Preferably, the controller 24 may include firmware or registers 26 that identify which phase should be used as the default phase. Furthermore, the controller 24 may include firmware or registers 28 that identify an order in which the phases should be recruited for use as the demand for current increases.

The baseboard management controller 30 is in communication with the voltage regulator 20 to obtain a value for at least one operating parameter (i.e., an operating condition) and to instruct the controller 24 to designate a selected phase as the default phase (i.e., for storage in the firmware/register 26) or designate a particular phase order (i.e., for storage in the firmware/register 28). To this end, the baseboard management controller 30 includes, or otherwise has access to, memory 32 that stores voltage regulator phase control logic 34 and voltage regulator phase operating data 36. The voltage regulator phase operating data 36 may include the raw values of the operating parameters that are received from the voltage regulator controller 24 for each phase 21, 22, 23. Alternatively, the voltage regulator phase operating data 36 may include only various cumulative values of at least one operating parameter that has been found to be correlated with the amount of wear incurred by a phase. The voltage regulator phase control logic 34 include program instructions that are executable by the baseboard management controller 30, which is a service processor. In one embodiment, the baseboard management controller 30 may process the program instructions to perform the tasks set out in the flowchart of FIG. 3.

The baseboard management controller 30 may also include voltage regulator alert generator logic 38. The voltage regulator alert generator logic 38 may output an alert to a user in response to the value of one or more of the operating parameters exceeding a threshold value. For example, if the cumulative power on hours exceeds a cumulative power on threshold, then the voltage regulator alert generator logic 38 may send an alert message to a remote management node 40 for output on a display device 42. Optionally, the management node 40 may run a web browser or other application program that can display a BMC interface 44 that includes the details of the alert.

FIG. 2 is an illustration of one example of the voltage regulator phase operating data 36 along with a calculated wear score 37 for each phase and a phase rank 39 for each phase. In this illustration, the voltage regulator phase operating data 36 is stored in a cumulative form, which means that the raw operating data (i.e., individual measurements) does not need to be retained in data storage. In the embodiment shown, the operating parameters include cumulative run time (hours), cumulative run time at a temperature greater than a temperature threshold (hours), and cumulative run time at a current greater than a current threshold (hours). The illustration also include a weighting, in units of percentage, for each operating parameter. A wear score 37 may be calculated for each phase as the sum of the weighted value of each operating parameter.

For example, phase 1 has a cumulative run time of 10,000 hours, a cumulative run time at a temperature greater than a temperature threshold of 5,000 hours, and cumulative run time at a current greater than a current threshold of 3,000 hours. Therefore, the phase 1 wear score equals 5,200 (i.e., (0.2×10,000)+(0.4×5,000)+(0.4×3,000)). After calculating a wear score for each phase, the phases are each assigned a rank 39 starting with the phase having the lowest wear score and ending with the phase having the highest wear score. In this illustration, phase 3 has the lowest wear score and may be identified to the controller 24 for storage as the default phase 26 (see FIG. 1). In other embodiments, the ranked order (i.e., phase 3, then phase 2, then phase 1) may be identified to the controller 24 for storage as the phase order 28 (see FIG. 1). In either embodiment, the phase or phases with less wear may be used prior to a phase or phases with greater wear. This leads to more uniform wear among the phases, which is expected to prevent premature failure of any phase of the voltage regulator.

Figure 3:
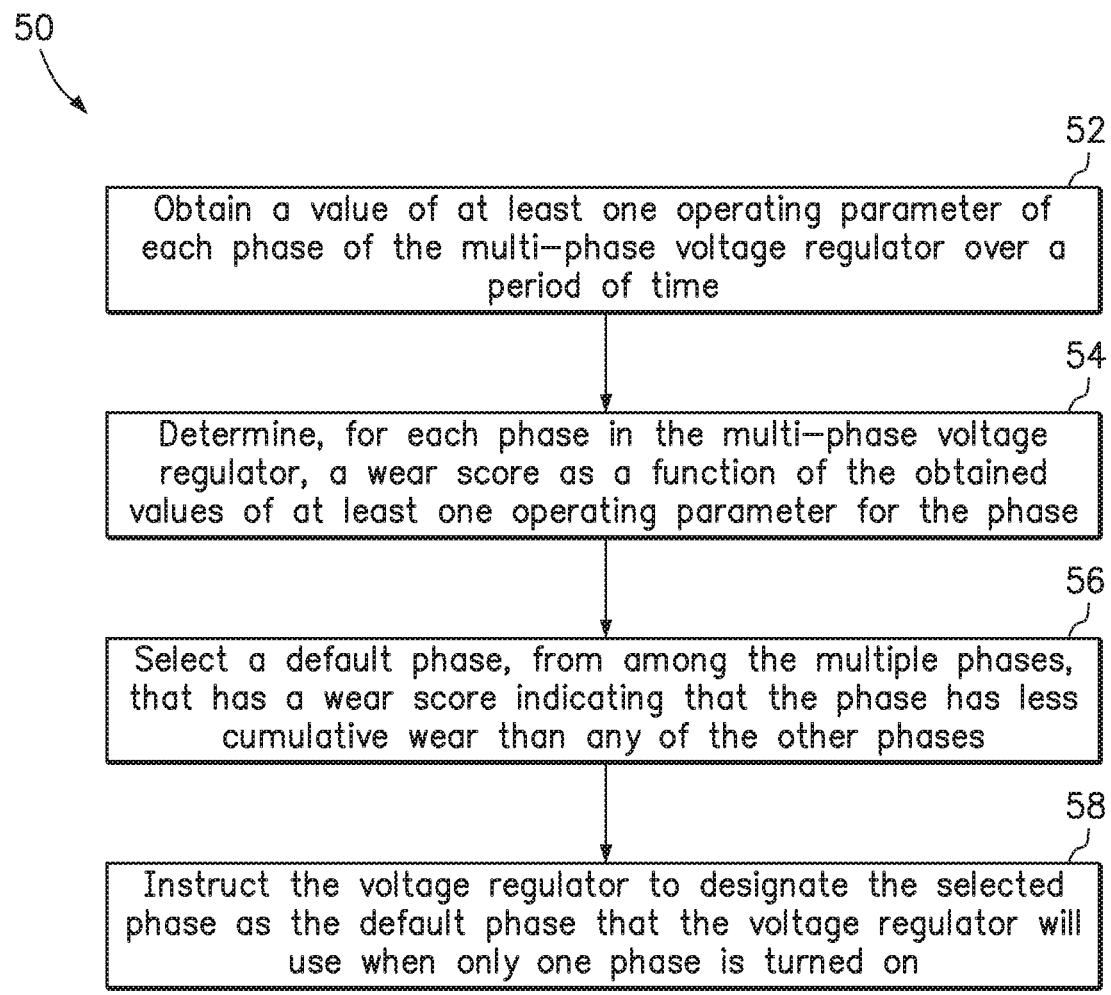
FIG. 3 is a flowchart of a method.

FIG. 3 is a flowchart of a method 50. The method may be implemented in an apparatus including a multi-phase voltage regulator having a controller and a plurality of phases, wherein the controller controls each of the phases and designates a default phase that is used when only one phase is turned on. The apparatus further includes a baseboard management controller in communication with the voltage regulator and at least one storage device for storing program instructions, wherein the baseboard management controller includes a processor for processing the program instructions to perform various tasks.

In step 52, the baseboard management controller may obtain a value of at least one operating parameter of each phase of the multi-phase voltage regulator over a period of time. In step 54, the baseboard management controller may determine, for each phase in the multi-phase voltage regulator, a wear score as a function of the obtained values of at least one operating parameter for the phase. In step 56, the baseboard management controller may select a default phase, from among the multiple phases, that has a wear score indicating that the phase has less cumulative wear than any of the other phases. Then, in step 58, the baseboard management controller may instruct the voltage regulator to designate the selected phase as the default phase that the voltage regulator will use when only one phase is turned on.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
    obtaining, for each phase in a voltage regulator having multiple phases, values of at least one operating parameter over a period of time;
    determining, for each phase in the multi-phase voltage regulator, a wear score as a function of the obtained values of at least one operating parameter;
    selecting a default phase, from among the multiple phases, that has a wear score indicating that the phase has less cumulative wear than any of the other phases; and
    instructing the voltage regulator to turn on the selected phase as a default phase when only one phase is turned on.

2. The computer program product of claim 1, the operations further comprising:
    ranking each phase in an order of the wear score; and
    instructing the voltage regulator to sequentially turn on the phases in the ranked order.

3. The computer program product of claim 2, wherein the wear score, for each phase in the multi-phase voltage regulator, increases with additional use of the phase.

4. The computer program product of claim 3, wherein the order ranks each phase in descending order of the wear score.

5. The computer program product of claim 1, wherein the at least one operating parameter is selected from input voltage, field-effect transistor (FET) temperature, run time, output current, and combinations thereof.

6. The computer program product of claim 1, the operations further comprising:
outputting a warning to a user in response to identifying that one or more phase, from among the multiple phases, has a wear score greater than a wear threshold value.

7. The computer program product of claim 1, the operations further comprising:
outputting a warning to a user in response to identifying that each of the multiple phases has a wear score greater than a wear threshold value.

8. The computer program product of claim 1, wherein the default phase is independently selected, from among the multiple phases, following each power cycle of the voltage regulator.

9. The computer program product of claim 1, wherein the multiple phases are parallel switching stages.

10. The computer program product of claim 1, wherein the wear score is calculated by weighting the influence of multiple operating parameters.

11. The computer program product of claim 10, wherein the weighting that is applied to the value of each operating parameter has been predetermined to approximate an amount of wear in a nominally similar voltage regulator having similar values of the at least one operating parameter.

12. The computer program product of claim 1, wherein the wear score is determined using a lookup table including multiple records, each record including the value of one or more operating parameters in association with a wear score.

13. The computer program product of claim 1, wherein the at least one operating parameter includes run time.

14. The computer program product of claim 1, wherein the at least one operating parameter includes an operating parameter that is cumulative over the lifetime of the voltage regulator.

15. An apparatus, comprising:
a baseboard management controller configured to communicate with a multi-phase voltage regulator, the baseboard management controller comprising a processor; and
a storage device connected to the baseboard management controller and comprising program instructions, the program instructions configured to be executable by the processor to cause the baseboard management controller to perform operations comprising:
obtaining a value of at least one operating parameter of each phase of the multi-phase voltage regulator over a period of time;
determining, for each phase in the multi-phase voltage regulator, a wear score as a function of the obtained values of the at least one operating parameter for the phase;
selecting a default phase, from among the multiple phases, that has a wear score indicating that the phase has less cumulative wear than any of the other phases; and
instructing the voltage regulator to designate the selected phase as a default phase that the voltage regulator will use when only one phase is turned on.

16. The apparatus of claim 15, the operations further comprising:
ranking each phase in an order of the wear score; and
instructing the voltage regulator to sequentially turn on the phases in the ranked order.

17. The apparatus of claim 15, further comprising:
a display device communicatively coupled to the baseboard management controller to receive a warning from the baseboard management controller indicative of each of the multiple phases having a wear score greater than a wear threshold value.

18. The apparatus of claim 16, the operations further comprising:
selecting, from among the multiple phases, a default phase following each power cycle of the voltage regulator.

19. The apparatus of claim 15, wherein the multiple phases are parallel switching stages.

* * * * *